US007666372B2

(12) United States Patent
Puvvada et al.

(10) Patent No.: US 7,666,372 B2
(45) Date of Patent: Feb. 23, 2010

(54) PROCESS FOR THE TREATMENT OF ELECTRIC AND OTHER FURNACE DUSTS AND RESIDUES CONTAINING ZINC OXIDES AND ZINC FERRITES

(76) Inventors: George Puvvada, 97 Stirling Crescent, Markham, Ontario (CA) L3R 7J9; Douglas Bartholomew, 1325 Little Blue Heron Ct., Naples, FL (US) 34108

( * ) Notice: Subject to any disclaimer, the term of this patent is extended or adjusted under 35 U.S.C. 154(b) by 0 days.

(21) Appl. No.: 11/883,359

(22) PCT Filed: May 3, 2006

(86) PCT No.: PCT/CA2006/000708
§ 371 (c)(1),
(2), (4) Date: Jul. 31, 2007

(87) PCT Pub. No.: WO2006/119611
PCT Pub. Date: Nov. 16, 2006

(65) Prior Publication Data
US 2008/0145289 A1    Jun. 19, 2008

Related U.S. Application Data

(60) Provisional application No. 60/679,255, filed on May 10, 2005.

(51) Int. Cl.
*C01G 9/00* (2006.01)

(52) U.S. Cl. ..................................................... 423/101

(58) Field of Classification Search .................... None
See application file for complete search history.

(56) References Cited

U.S. PATENT DOCUMENTS 4,256,723 A * 3/1981 Urban, Jr. .................... 423/633
5,912,402 A * 6/1999 Drinkard et al. .............. 75/743

FOREIGN PATENT DOCUMENTS

EP        935005 A1 * 8/1999
GB      1218762 A  * 4/1977

* cited by examiner

*Primary Examiner*—Melvin C Mayes
*Assistant Examiner*—Melissa Stalder
(74) *Attorney, Agent, or Firm*—Elias Borges

(57) ABSTRACT

The present invention is a method of recovering valuable metals from a quantity of furnace dust consisting the following steps. A first leaching step wherein the furnace dust is leached at atmospheric pressure in a first leaching solution to produce a first leach liquor and a first leach residue, the first leaching solution consisting of an aqueous mineral acid solution. The first leach liquor is then separated from the first leach residue. A second leaching step is then performed wherein the first leach residue is atmospherically leached in a second leaching solution to form a second leach liquor and a second leach residue, the second leaching solution comprising a solution of aqueous HCl with a reductant. The second leach liquor is then separated from the second leach residue. A zinc precipitation step is then performed wherein zinc is precipitated from the second leach liquor by treating the second leach liquor with a quantity of alkali, the quantity of alkali selected to adjust the pH of the second leach liquor sufficiently to precipitate out the zinc in the form of a zinc salt in a third residue leaving a third liquor and then separating the third residue containing zinc from the third liquor.

15 Claims, 1 Drawing Sheet

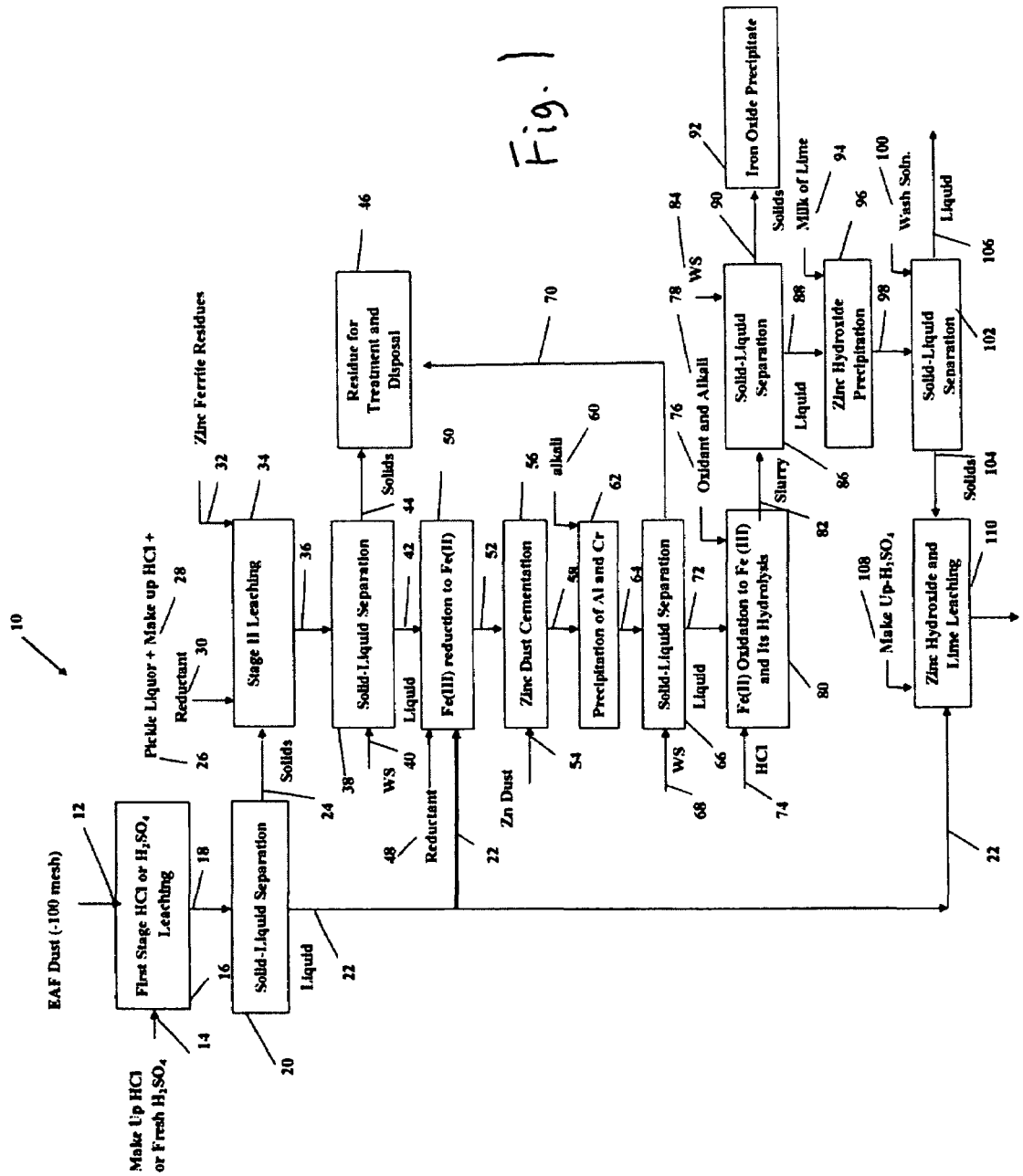

PROCESS FOR THE TREATMENT OF ELECTRIC AND OTHER FURNACE DUSTS AND RESIDUES CONTAINING ZINC OXIDES AND ZINC FERRITES

CROSS REFERENCE TO RELATED APPLICATION

This application claims priority from provisional patent application Ser. No. 60/679,255 filed May 10, 2005, the entirety of which is incorporated herein by reference.

FIELD OF THE INVENTION

The method of present invention relates to a process for the treatment of Electric and other furnace dusts and residues containing zinc oxides and zinc ferrites. The method presents a process for the recovery of zinc and other values from EAF dusts and zinc ferrites.

BACKGROUND OF THE INVENTION

Electric arc furnace (hereafter referred as EAF) dust contains elements such as zinc, iron, lead, aluminum, chromium, cadmium, manganese, sodium, potassium, magnesium and calcium. The zinc in the dust is present as zinc oxide and zinc ferrite. EAF dust is regarded as a hazardous waste because of the presence of significant amounts of leachable compounds of zinc, lead, cadmium and chromium. This classification as a hazardous waste means that the EAF dust can not be disposed off with out treatment. EAF dust that is obtained from processing ferrous steel scrap will have a K061 "Hazardous Rating" as per US Environmental Protection Agency Standards. Salvaged ships, structural steel, galvanized steel and primary automobile scrap are the major sources of feed to the smelting furnaces. The problem with untreated EAF dust in US and various other countries is substantial. Many tons of EAF dust are presently stored in US at the existing furnace operations at a rate of about 500,000 to 750,000 tons per year. The pyrometallurgical processors can only process about 250,000 to 300,000 tons per year, and this ads to the stockpile at the rate of 250,000 to 500,000 tons per year.

The various options that are available to the generator includes disposal, recycle and/or recovery of valuable metals. A current major route of disposal is stabilization and landfilling. However, stabilization and landfilling loses the potential of recovering zinc and other metals. The other two options are: a) Reducing the dust with coal, methane or hydrogen at an elevated temperature and separating the condensable zinc vapor from a non-volatile slag using pyrometallurgical techniques, b) Removing the zinc by a hydrometallurgical process.

The recycling of electric arc furnace dusts by pyrometallurgical and hydrometallurgical techniques have been the subject of many studies. Pyrometallurgical processes require reducing agents and high temperatures and generally produce a crude zinc oxide of low commercial value. On the other hand hydrometallurgical processes can produce high quality metallic zinc or zinc oxide, but most of them can not leach zinc completely from the zinc ferrite phase.

The hydrometallurgical methods for the treatment of EAF dusts could be classified into acidic and alkaline leaching systems. The acid leaching systems that are studied by several inventors are the sulfuric acid and hydrochloric acid systems. These two acids were investigated on a stand alone basis and also in the presence of additives. Most processes using sulfuric acid require high temperature and high-pressure conditions in order to avoid jarosite formation. In most of the hydrometallurgical inventions atmospheric leaching of zinc ferrite material is difficult and therefore several investigations using expensive pressure leaching techniques were patented.

In a Canadian patent 2076025 recovery of metal values from zinc plant residues containing zinc ferrites is disclosed. The process consists of partial dissolution of zinc, copper, iron and some impurities with spent $H_2SO_4$ at 70-100° C. Then mix the leach slurry with zinc concentrate and subject to oxidative leach followed by reductive leach in a hot sulfuric acid system. The resulting residue is then subjected to flotation to recover the undissolved zinc concentrate. The flotation tailings were subjected to pressure leaching using gaseous sulfur dioxide. The process described consists of several leaching, flotation and pressure leaching steps and therefore is capital intensive. In Canadian patent 2240450 leaching of zinc ferrite with peroxysulphuric acid was disclosed. In Canadian patents 1217638 and 2104736 two stage leaching with sulphuric acid was disclosed. In the second stage sodium, potassium or ammonium ions were added for jarosite formation. The amount of sulphuric acid added in the second stage was slightly in excess to the amount of ferrite material present. In U.S. Pat. No. 5,286,465 use of hot concentrated sulfuric acid leaching was disclosed.

In Canadian patent 1212841 a process for the extraction of zinc from zinc ferrite residues by pressure leaching with sulphuric acid in an autoclave system was disclosed. In Canadian patent 1176853 zinc ferrite was combined with zinc sulphide ore and then pressure treated at elevated temperature to dissolve zinc from the ferrite as well as the sulphide ore. In another Canadian patent 1112880 leaching with aqueous sulfuric acid at an elevated temperature of 140 to 250° C. and 3-40 atm pressure was carried out. These high temperature and high pressure processes are in general are more expensive to the atmospheric leaching processes. In U.S. Pat. No. 4,610,721 atmospherically leaching the steel plant dust in a first stage wherein an amount of steel plant dust is mixed with an amount of acidic zinc sulfate solution to leach zinc therefrom. Solution pH was controlled between 2.5 and 3.5. Following thickening additional sulfuric acid or the spent electrolyte was added and subjected to pressure leaching.

Processes using hydrochloric acid solutions and mixed acid solutions containing HCl are discussed. In Canadian patent 2156295 and in U.S. Pat. No. 5,336,297 a process for the treatment of Electric Arc Furnace dust was disclosed. This process consists of atmospheric ferric chloride leach followed by treatment in autoclave at elevated temperature and pressure for the conversion of goethite to easily filterable hematite. In U.S. Pat. No. 5,709,730 leach solution was made of calcium chloride and HCl and leaching was conducted under controlled pH of 2.6 at an elevated temperature and pressure in an oxygen environment. Mixed oxides were recovered through precipitation by lime addition.

In U.S. Pat. Nos. 4,614,543 and 4,610,722 use of mixed lixiviant system made of HCl and $H_2SO_4$ was disclosed. The leaching of zinc was reported to be 70 to 71%. In U.S. Pat. No. 4,572,771 steel plant dust was leached with hydrochloric acid to provide pregnant liquor containing zinc, iron and lead. Zinc was electrowon and HCl was regenerated. All of the above processes use solvent extraction technology for zinc extraction followed by electrolysis of zinc strip liquor to produce zinc metal. In U.S. Pat. No. 6,338,748 a process was disclosed where hot acid leach containing 37-74 g/L of HCl and 104-

270 g/L of $ZnCl_2$ is used. This process claims the dissolution of both zinc oxide and zinc ferrite phases.

SUMMARY OF THE INVENTION

The present invention is a method of recovering valuable metals from furnace dusts such as electric arc furnace. A method includes a first atmospheric leaching step wherein the furnace dust is treated with a first leaching solution to produce a first leach liquor and a first leach residue. The first leaching solution is either aqueous HCl or aqueous $H_2SO_4$. The first leach liquor is then separated from the first leach residue after the first leaching. The first leach residue is then leached in a second leach step with a second leaching solution to form a second leach liquor and a second leach residue. The second leaching solution consist of a solution of aqueous HCl and a reductant, or a combination of aqueous HCl and waste pickle liquor and a reductant. The reductant is $SO_2$, sulphurous acid, NaSH, $H_2S$ or $(CH_3)_2SO$, or a combination of these reductants. The second leach liquor is then separated from the second leach residue after the second leaching. Finally, zinc in the form of a zinc salt or mixed zinc hydroxide cake is precipitated from the second leach liquor by treating the second leach liquor with a quantity of alkali. The precipitated zinc oxide/hydroxide is redissolved in sulphuric acid or in the first stage sulphuric acid leach liquor. The zinc values from this liquor are recovered either as zinc metal or zinc oxide.

BRIEF DESCRIPTION OF THE ATTACHED DRAWINGS

The accompanying drawing, which is included to provide a further understanding of the invention, is incorporated in and constitute a part of this specification. Illustrate embodiments of the invention together with the description serve to explain the principles of the drawings.

FIG. 1 is a schematic representation illustrating part of the process of the present invention.

DETAILED DESCRIPTION OF THE INVENTION

The present invention is a method for treatment of EAF dust using a two stage atmospheric leaching process wherein the first stage leach consists of direct HCl or $H_2SO_4$ leach followed by filtration and the second stage leach consists of HCl leach in the presence of reducing agents. During the first stage leach most of the zinc present as zinc oxide is solubilized and in the second stage leach most of the zinc present as zinc ferrite is solubilized.

Direct HCl or $H_2SO_4$ leaching is conducted in the first stage, and after the first stage leaching solid-liquid separation is performed. The HCl concentration is maintained between about 1 and 3N depending upon the grade of the EAF dust treated and the percent solids (pulp density) is maintained between about 10 and 30%. The leach temperature is maintained between about 70° C. and near boiling temperature. The residue generally contains undissolved iron and zinc ferrite material which is kept for second stage leaching.

FIG. 1 shows a schematic representation of an embodiment of the method of the present invention, generally indicated by 10, in which zinc and iron values are recovered from EAF dusts and furnace and leach residues of similar composition. In method 10 EAF dust 12 is fed to leach tank 16 after conducting prior screening using standard mineral processing techniques. An acid solution containing HCl or $H_2SO_4$ is also fed to the leach tank 16. The acid solution may contain fresh acid solution 14, as shown in FIG. 1. The zinc values along with other contaminating elements such as iron, manganese, chromium, aluminum, lead, cadmium, sodium, potassium, magnesium and calcium present in the oxide form would go into the leach liquor. The first stage leach slurry solid-liquid separation 20 occurs readily easily. The solid-liquid separation 20 produces a liquid stream 22 and a solid residue stream 24.

The leach residue obtained from the first stage leaching is slurried in a HCl solution of about 2-3.5N or a combination of HCl and waste HCl pickle liquor. The leach temperatures are kept between 70 and near boiling temperatures. During the second stage leaching a reductant such as $SO_2$ (added as sulfurous acid or gas) and/or NaSH and/or Dimethyl Sulfoxide is/are added to the slurry to provide reducing conditions. This novel atmospheric second stage leaching provides leach conditions suitable for the dissolution of zinc and other ferrites present in the first stage leach residue. The zinc values along with other contaminating elements such as iron, manganese, chromium, aluminum, lead, cadmium, sodium, potassium, magnesium and calcium present predominantly in the ferrite form would go into the leach liquor.

The solid residue 24 obtained in first stage leaching is fed to tank 34 along with fresh make up HCl 28, pickle liquor 26, reductant 30 and any other zinc ferrite bearing residues/materials 32 for second stage leaching. The second stage leaching produces a leach slurry 36. The leach slurry 36 is fed to solid-liquid separation 38, where the solids are washed with wash solution 40. Thus a liquid stream 42 and a solid stream 44 are produced. The solids 44 after washing are discarded or may be treated in tank 46 prior to disposal.

The second stage leach liquor is subjected to reduction step where Fe(III) is reduced to Fe(II) through the addition of a reductant 48. This step is carried out in tank 50 where the product stream produced is 52. The solution 52 is then carried to tank 56 where zinc dust 54 is added for lead and cadmium cementation. Stream 58 produced in tank 56 is fed to tank 62 where an alkali 60 is added to raise the solution pH to between 4.0 and 5.0, in order to precipitate aluminum and chromium. The slurry produced 64 is fed to 66 for solid-liquid separation, where the solids are washed with wash solution 68. The solids 70 produced are discarded along with stream 44. The liquid stream 72 is fed to tank 80, where HCl 74, oxidant 76 and an alkali 78 such as magnesium oxide are fed. The Fe(II) is oxidized to Fe(III) and then hydrolyzed to iron oxide phases. The oxidant may be sodium chlorate, sodium hypochlorite and chlorine gas in combination with oxygen. The solution pH is raised to between about 1.5 and 3.0. Hematite seeding is used to produce a near hematite form of iron oxide precipitate, which filters readily easily. The hematite seed used may be 5 to 40% by weight of the iron content of the second stage leach liquor.

The slurry 82 thus produced is then fed to a solid-liquid separation tank 86, where the solids are washed with wash solution 84. The iron oxide solids produced are stored in 92 for further processing. The liquid 88 containing zinc is precipitated with the addition of milk of lime 94 in tank 96. The zinc hydroxide containing slurry 98 is subjected to solid-liquid separation 102 and the solids are washed with wash solution 100.

The solids 104 containing zinc hydroxide and lime are leached with leach liquor 22 and with make-up sulfuric acid 108 in tank 110. Thus produced zinc rich liquor will be processed to produce zinc products such as zinc metal or zinc oxide using standard methods. The method of the present invention will now be further disclosed with reference to the following examples.

EXAMPLE I

Leaching

Two samples of EAF dust were subjected to the method of the present invention. The size analysis conducted on the EAF dust samples A and B are shown in Table 1. Sample A was found to be much finer in its size distribution compared to Sample B. Sample A was found to contain 99.7% of the dust finer than 300 microns, whereas Sample B was found to contain 80.0% finer than 300 microns. For leaching experiments −100 mesh size particles were used, which are less than 150 microns in size.

TABLE 1

Screen analysis of EAF dust samples

| Mesh Size | Sample A (Cum. Wt %) | Sample B (Cum. Wt %) |
|---|---|---|
| +½" | — | 1.94 |
| +⅜" | — | 4.73 |
| +6 | — | 9.94 |
| +10 | — | 13.6 |
| +20 | — | 16.2 |
| +48 | 0.25 | 20.0 |
| +65 | 0.58 | 22.1 |
| +100 | 1.20 | 24.2 |
| +200 | 4.30 | 28.3 |
| +400 | 9.40 | 32.7 |

The average chemical analysis of a blend sample, 50% each of Sample A and Sample B, is shown in Table 2. The sample was found to contain 15.1% of zinc and the other major elements found are iron and calcium analyzing 16.6% and 7.4%, respectively. There were a host of other elements present in the dust and their analysis is given in Table 2.

TABLE 2

Chemical analysis of EAF blend sample

| Element | Wt % |
|---|---|
| Zn | 15.1 |
| Fe | 16.6 |
| Mn | 1.70 |
| Pb | 0.95 |
| Cr | 0.15 |
| Si | 1.40 |
| Al | 0.44 |
| Cd | 0.03 |
| Ca | 7.35 |
| Mg | 1.68 |
| Na | 1.40 |

Step 1. The samples were subjected to the first leach step. The leach test conditions are shown in Table 3, where the tests were conducted for periods of 1 to 4 h, between temperatures of 25 to 95° C. and at percent solids of 10 to 25. The final residues obtained were sampled and analyzed. The pregnant leach liquor analysis, percent extractions of zinc and iron and the solids weight losses obtained for the tests conducted are presented in Table 4.

Tests 1 through 7 were conducted using HCl and 8 to 10 were conducted using $H_2SO_4$. The leach liquor analysis given in Table 4 indicates that the dissolution of zinc increases with an increase in the acid concentration and temperature. In test 7 the highest extractions of zinc and iron i.e., 93.1% and 67.0%, respectively, were obtained where the HCl/Ore ratio used was 0.91.

One of the objectives of this invention is to reduce the HCl consumption by adding reducing agents to HCl, and yet obtain higher extractions of zinc and iron from the EAF dust. This was attempted using a two stage leaching approach in order to overcome the filtration problem.

TABLE 3

Experimental conditions for the leach tests

| Test No. | HCl Conc. | HCl/Ore | % Solids | Time (h) | Temp (° C.) |
|---|---|---|---|---|---|
| 1 | 1.0N | 0.10 | 20 | 4 | 95 |
| 2 | 2.0N | 0.25 | 20 | 4 | 95 |
| 3 | 3.0N | 0.31 | 25 | 1 | 95 |
| 4 | 3.0N | 0.42 | 20 | 1 | 95 |
| 5 | 3.0N | 0.31 | 25 | 1 | 70 |
| 6 | 3.0N | 0.42 | 20 | 1 | 25 |
| 7 | 3.0N | 0.91 | 10 | 1 | 95 |

| Test No. | $H_2SO_4$ Conc. | $H_2SO_4$/Ore | % Solids | Time (h) | Temp (° C.) |
|---|---|---|---|---|---|
| 8 | 3.0N | 0.56 | 20 | 1 | 70 |
| 9 | 3.0N | 0.56 | 20 | 1 | 85 |
| 10 | 2.0N | 0.37 | 20 | 1 | 95 |

TABLE 4

The pregnant liquor analysis obtained for different leach tests

| Test No. | HCl (kg/Ton) | Zn (g/L) | Fe (g/L) | % Zn Extrn | Fe Extrn. | % Wt. Loss |
|---|---|---|---|---|---|---|
| 1 | 121.0 | 2.02 | 0.00 | 2.4 | 0.00 | 10.0 |
| 2 | 242.0 | 17.0 | 0.00 | 33.3 | 0.00 | 25.0 |
| 3 | 312.0 | 38.1 | 0.00 | 55.4 | 0.00 | 30.0 |
| 4 | 420.0 | 30.4 | 0.00 | 70.0 | 0.00 | 42.0 |
| 5 | 312.0 | 26.7 | 0.00 | 49.3 | 0.00 | 30.3 |
| 6 | 420.0 | 35.5 | 2.5 | 67.1 | 5.10 | 44.0 |
| 7 | 909.0 | 18.1 | 20.0 | 93.1 | 67.0 | 83.3 |

| Test No. | $H_2SO_4$ (kg/Ton) | Zn (g/L) | Fe (g/L) | % Zn Extrn | Fe Extrn. | % Wt. Loss |
|---|---|---|---|---|---|---|
| 8 | 565.0 | 35.1 | 0.02 | 50.0 | 0.0 | 51.1 |
| 9 | 565.0 | 42.4 | 0.44 | 65.2 | 0.5 | 38.2 |
| 10 | 377.0 | 26.4 | 0.00 | 51.5 | 0.0 | 40.4 |

Step 2. The leach residue obtained from step 1, was then subjected to the second leach step. Second stage leach tests were carried out on the combined leach residues obtained from tests 4 and 6 to extract the rest of the zinc present as zinc ferrite. The head assay of the blended residues is given in Table 5.

TABLE 5

Head assay of the leach residue blend

| Element | Wt % |
|---|---|
| Zn | 9.70 |
| Fe | 31.6 |
| Pb | 0.93 |
| Mn | 2.20 |
| Cr | 0.38 |
| Al | 0.60 |
| Ca | 1.85 |
| Mg | 1.30 |

This leach residue was subjected to second stage leach using HCl, and HCl in combination with reducing agents such as $SO_2$, NaSH and $(CH_3)_2SO$. The test conditions and the results obtained are provided in Table 6. All tests were conducted at atmospheric pressure. These tests have shown increased extractions of zinc and iron due to the liberation of zinc from zinc ferrite phase. Comparing the zinc extractions obtained in tests 13 and 17, the addition of $SO_2$ was found to increase the zinc extraction from 65% to 90.1%.

Stage 2 leaching was further investigated using HCl pickle liquor generated by the steel mills. The pickle liquor head assay is shown in Table 8. The second stage leach test conditions using pickle liquor is shown in Table 9. The leach extractions obtained using pickle liquor are provided in Table 10, where the zinc extraction of 98.7% and iron extractions of 95.6% were obtained in the second stage leaching at a HCl addition of 214.5 kg/ton of ore. Using pickle liquor the HCl requirement for stage I and stage II leaching is reduced to 634.5 kg/Ton of ore from 727.4 kg/Ton of ore.

TABLE 6

Conditions for second stage leaching

| Test No. | HCl Conc. | HCl/Ore | Reductant (Wt % of Solids) | Temp-Time | Soln. Volm. (ml) | % Zn Extrn | Fe Extrn. | % Wt Loss |
|---|---|---|---|---|---|---|---|---|
| 11 | 1.0N | 0.18 | No Reductant | 95 C.-2 h | 0.1 L | 34.2 | 8.10 | 33.5 |
| 12 | 2.0N | 0.35 | No Reductant | 95 C.-2 h | 0.1 L | 55.7 | 34.0 | 62.5 |
| 13 | 3.0N | 0.53 | No Reductant | 95 C.-2 h | 0.1 L | 62.0 | 47.3 | 70.0 |
| Second Stage Leaching in the Presence of Reductants | | | | | | | | |
| 16 | 3.0N | 0.53 | 5.0-$SO_2$ | 95 C.-2 h | 0.1 L | 79.6 | 65.9 | 81.5 |
| 17 | 3.0N | 0.53 | 5.0-$SO_2$ | 75 C.-2 h | 0.1 L | 90.1 | 81.3 | 90.0 |
| 18 | 3.5N | 0.62 | 5.0-$SO_2$ | 95 C.-2 h | 0.1 L | 87.3 | 73.2 | 82.5 |
| 19 | 3.0N | 0.53 | 10.0-NaSH | 95 C.-2 h | 0.1 L | 73.8 | 54.6 | 70.5 |
| 20 | 3.0N | 0.53 | 25.0-NaSH | 95 C.-2 h | 0.1 L | 82.0 | 70.5 | 82.5 |
| 21 | 3.0N | 0.53 | 25-$(CH_3)_2SO$ | 75 C.-2 h | 0.1 L | 78.7 | 67.0 | 81.5 |
| 22 | 3.0N | 0.53 | 25-$(CH_3)_2SO$ | 95 C.-2 h | 0.1 L | 84.1 | 74.4 | 86.5 |

The second stage leach results have shown that extracting zinc from the predominantly zinc-ferrite phase is difficult in the presence of HCl alone. However when added reducing agents such as $SO_2$, NaSH and $(CH_3)_2SO$ to the leach liquor the dissolution of zinc ferrite enhanced. In U.S. Pat. No. 6,338,748 Lee et al., have obtained 90% of zinc extraction in a two stage leach approach using a 2.0N HCl in the presence of 50-130 g/L of $ZnCl_2$. At these conditions they used 1100 kg of HCl per 1000 kg of ore. The acid to ore ratio needed was 1.1 in their invention.

In the present invention the extraction of zinc using 909 kg of HCl per 1000 kg of ore has resulted in 93.1%, where the HCl concentration maintained was 3.0N. Using a two stage approach the extraction of zinc has resulted in 89.5% at a combined acid addition of 727.4 kg/ton. However in the presence of reducing agents such as $SO_2$, NaSH and $(CH_3)_2SO$ the extractions of zinc further increased to 97, 94.6 and 95.2%, respectively at a reduced acid addition of 727.4 kg/ton. These results are shown in Table 7. In the presence of $SO_2$ the extraction of iron increased from 54.4% to 81%.

In the event of using $H_2SO_4$ for stage I leaching the total acid requirement is found to be 591.5 kg/Ton of ore to obtain a combined (stage I and Stage II) zinc and iron extractions of 98.7% and 95.6%, respectively. These results show using $H_2SO_4$ in the 1st stage leach is beneficial with respect to acid consumption compared to using HCl in the stage I leaching.

TABLE 8

Head assay of steel mill waste pickle liquor

| Element | ppm |
|---|---|
| Zn | <2 |
| Fe | 66000 |
| Pb | <5 |
| Mn | 400 |
| Cr | 39 |
| Al | 36 |
| Ca | 59 |

TABLE 7

Cumulative extractions of zinc and iron

| Test Nos. | HCl kg/Ton | Reductant Used | First Stage Leaching | | Second Stage Leaching | | Cumulative Extractions (I + II) | |
|---|---|---|---|---|---|---|---|---|
| | | | % Zn Extrn | % Fe Extrn. | % Zn Extrn | % Fe Extrn. | % Zn Extrn | % Fe Extrn. |
| 7 | 909.0 | None | 93.1 | 67.0 | — | — | 93.1 | 67.0 |
| 4 + 13 | 727.4 | None | 70.0 | 0.0 | 18.6 | 47.3 | 88.6 | 47.3 |
| 4 + 17 | 727.4 | $SO_2$ | 70.0 | 0.0 | 27.0 | 81.3 | 97.0 | 81.3 |
| 4 + 20 | 727.4 | NaSH | 70.0 | 0.0 | 24.6 | 70.5 | 94.6 | 70.5 |
| 4 + 22 | 727.4 | $(CH_3)_2SO$ | 70.0 | 0.0 | 25.2 | 74.4 | 95.2 | 74.4 |

TABLE 8-continued

Head assay of steel mill waste pickle liquor

| Element | ppm |
|---|---|
| Mg | 12 |
| Na | 38 |
| F | <1 |
| Cl | 208000 |

TABLE 9

Conditions for second stage leaching using pickle liquor

| Test No. | HCl Conc. | HCl/Ore | Reductant Used | Temp-Time | Soln. Volm. (ml) | % Zn Extrn | Fe Extrn. | % Wt Loss |
|---|---|---|---|---|---|---|---|---|
| 23 | 3.0N | 0.27 | $SO_2$ | 95 C.-2 h | 1 L | 69.0 | 55.6 | 59.1 |
| 24 | 3.0N | 0.36 | $SO_2$ | 95 C.-2 h | 1 L | 98.7 | 95.6 | 74.1 |
| 25 | 3.0N | 0.47 | $SO_2$ | 95 C.-2 h | 1 L | 97.4 | 97.7 | 73.3 |

TABLE 10

Cumulative extractions of zinc and iron

| Test Nos. | $H_2SO_4$/HCl kg/Ton | HCl kg/Ton | Total Acid kg/Ton | First Stage Leaching | | Second Stage Leaching | | Cumulative Extractions (I + II) | |
|---|---|---|---|---|---|---|---|---|---|
| | | | | % Zn Extrn | % Fe Extrn. | % Zn Extrn | % Fe Extrn. | % Zn Extrn | % Fe Extrn. |
| 10 + 23 | 377.0 | 167.0 | 544.0 | 51.5 | 0.0 | 30.0 | 55.6 | 66.0 | 55.6 |
| 10 + 24 | 377.0 | 214.5 | 591.5 | 51.5 | 0.0 | 98.7 | 95.6 | 99.4 | 95.6 |
| 10 + 25 | 377.0 | 280.0 | 657.0 | 51.5 | 0.0 | 97.4 | 97.7 | 98.7 | 97.7 |
| 4 + 24 | 420.0 | 214.5 | 634.5 | 55.4 | 0.0 | 98.7 | 95.6 | 99.4 | 95.6 |

EXAMPLE II

Leach Liquor Purification

In Step 3, the stage II leach liquor purification was attempted using techniques such as cementation and precipitation.

i) Removal of Lead and Cadmium from the II$^{nd}$ Stage Leach Liquor:

Test Conditions: Temp: 50-75, Time: 2-3 h
Cementation through: Iron and Zinc dust addition: 16 and 8 g respectively.

TABLE 11

Cementation test results

| Cementation Test | Volm. (cc) | pH | Eh (mV) | Solution Assays (ppm) | | | | | | | | |
|---|---|---|---|---|---|---|---|---|---|---|---|---|
| | | | | Zn | Fe(II) | Fe(III) | Pb | Mn | Cr | Al | Cu | Cd |
| | 1000 | 1.0 | 248 | 12578 | 30000 | 2030 | 1287 | 2640 | 241 | 614 | 32.6 | 17.0 |
| Soln. Assay after Fe Addition | | | | 12578 | 48030 | 0.00 | 1287 | 2640 | 241 | 614 | <0.1 | 17.0 |
| Soln. Assay after Zn Addition | 1000 | 1.5 | 200 | 20578 | 48030 | 0.00 | 8.0 | 2640 | 241 | 614 | | 0.0 | ii) Removal of Chromium and Aluminum from II$^{nd}$ Stage Leach Liquor:
   Test Conditions Temp: 50-75, Time: 2-3 h, pH: 4.5 to 5.5
      Neutralization through: Lime addition: 6-10 g

TABLE 12

Chromium and aluminum removal test results

| Cr and Al Removal Test | Volm. (cc) | pH | Eh (mV) | Solution Initial Assay (ppm) | | | | | | | |
|---|---|---|---|---|---|---|---|---|---|---|---|
| | | | | Zn | Fe | Pb | Mn | Cr | Al | Cu | Cd |
| Filtration | 1000 | 1.5 | 200 | 20578 | 48030 | 8.0 | 2640 | 241 | 614 | <0.1 | 0.0 |
| | | | | | | | Filtrate Assay | | | | |
| | 1000 | 5.0 | 200 | 20500 | 48000 | 8.0 | 2640 | 3.6 | 18.5 | | 0.0 | iii) Removal of Iron from II$^{nd}$ Stage Leach Liquor:
   Test Conditions Temp: 80-95 or Near Boiling, Time: 2-3 h
      Acidification through HCl addition followed by
      Oxidation through: Sodium chlorate or hypochlorite addition: 30-50 cc
      Neutralization through: MgO addition: 15 g
      Terminal pH: 3-5

TABLE 13

Iron removal test results

| Iron Removal Test | Volm. (cc) | pH | Eh (mV) | Solution Initial Assay (ppm) | | | | | | |
|---|---|---|---|---|---|---|---|---|---|---|
| | | | | Zn | Fe | Pb | Mn | Cr | Al | Cd |
| Filtration | 1000 | 0.55 | 384 | 20500 | 48000 | 8.0 | 2640 | 3.6 | 18.5 | 0.0 |
| | | | | | | Filtrate Assay (ppm) | | | | |
| | 1000 | 2.15 | 330 | 20500 | 0.0 | 0.0 | 2330 | 0.0 | 0.1 | 0.0 |
| Iron Oxide Dry Wt (g) | | | | | | Residue Analysis (%) | | | | |
| 74.0 | | | | | 2.0 | 64.8 | 0.01 | 0.41 | 0.0 | 0.0 | 0.0 |

EXAMPLE III

Zinc Hydroxide Precipitation

In Step 4 the precipitation of zinc from chloride solutions was attempted using lime.
Test Conditions Temp: 50-75, Time: 1-2 h,
   Neutralization through: Lime addition: 124.7 g, pH: 8.5 to 11.0

TABLE 14

Zinc hydroxide precipitation

| Zn(OH)$_2$ Precipitation | Volm. (cc) | pH | Solution Initial Assay (ppm) | | | | | | Cl— (%) |
|---|---|---|---|---|---|---|---|---|---|
| | | | Zn | Mn | Na | K | Mg | Ca | |
| | 1000 | 4.0 | 32500 | 2330 | 12140 | 883 | 2494 | 52000 | 12.7 |
| Neutralization and Solids Washing | | | | Filtrate Final Assay (ppm) | | | | | |
| | 1000 | 11.0 | 33.7 | 14.0 | 9832 | 1327 | 0.0 | 43880 | 9.5 |
| Cake Dry Wt. | | | | Residue Assay (%) | | | | | |
| 100 | | | 32.4 | 2.3 | — | — | 3.3 | 18.0 | — |

EXAMPLE IV

Zinc Hydroxide Precipitate Releach

In Step 6 the precipitated zinc as zinc hydroxide was re-leached using $H_2SO_4$ solution combined with stage I $H_2SO_4$ leach liquor.

Test Conditions Temp: 50-75, Time: 1-2 h

TABLE 16

Zinc hydroxide re-leach.

| $Zn(OH)_2$ Cake Leaching | Volm. (cc) | pH | Zn | Mn | Na | K | Mg | Ca | Cl— |
|---|---|---|---|---|---|---|---|---|---|
| Cake Dry Wt (g). 200 | | | 18.0 | 1.9 | — | — | 3.3 | 18.0 | — |
| Leaching with $H_2SO_4$ (100 g of $H_2SO_4$) | 1270.0 | 1.5-2.5 | | | Filtrate Assay (ppm) | | | | |
| | | | 28617 | 2633 | 2434 | 255 | 3686 | 2195 | — |
| Residue Dry Wt. 278.4 | | | | | Residue Assay (%) | | | 23.0 | — |

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A method of recovering valuable metals from a quantity of furnace dust comprising the steps of:
    a first leaching step wherein the furnace dust is leached at atmospheric pressure in a first leaching solution to produce a first leach liquor and a first leach residue, the first leaching solution comprising an aqueous mineral acid solution;
    separating the first leach liquor from the first leach residue alter the first leaching; a second leaching step wherein the first leach residue is atmospherically leached in a second leaching solution to form a second leach liquor and a second leach residue, the second leaching solution comprising a solution of aqueous HCl with a reductant;
    separating the second leach liquor from the second leach residue after the second leaching, and
    a zinc precipitation step wherein zinc is precipitated from the second leach liquor by treating the second leach liquor with a quantity of alkali, the quantity of alkali selected to adjust the pH of the second leach liquor sufficiently to precipitate out the zinc in the form of a zinc salt in a third residue leaving a third liquor and then separating the third residue containing zinc from the third liquor.

2. The method of claim 1 wherein the aqueous mineral acid solution is selected from the group consisting of aqueous HCl, aqueous $HNO_3$, aqueous $H_2SO_4$ and perchloric acid.

3. The method of claim 1 wherein the reductant used in the second leaching step is selected from a group of reagents consisting of $SO_2$, NaSH, $H_2S$ $(CH_3)_2SO$ and $Na_2S$.

4. The method of claim 1 wherein the second leaching solution comprises a solution of waste steel mill pickle liquor and a reductant.

5. The method of claim 4 wherein the reductant used in the second leaching step is selected from the group of reagents consisting of $SO_2$, NaSH, $H_2S$, $(CH_3)_2SO$ and $Na_2S$.

6. The method of claim 1 further comprising the step of subjecting the second liquor to an iron removal step wherein iron is precipitated out of solution as iron oxide and then separating the solid from the liquid to form an iron oxide containing residue and an iron removed second liquor prior to the zinc precipitation step.

7. The method of claim 1 further compromising the step of purifying the second leach liquor prior to zinc precipitation, the purification is done by zinc dust cementation and precipitation and ten performing solid liquid separation to form a purified second leach liquor and a cementation residue, the purified second Leach liquor then undergoing the zinc precipitation step.

8. The method of claim 7 further comprising the step of performing an iron precipitation step on the purified second leach liquor prior to the zinc precipitation step, the iron precipitation step precipitates the iron out of solution as iron oxide.

9. The method of claim 8 wherein the first leach liquor is aqueous $H_2SO_4$ and further comprising the steps of leaching the third residue with the first liquor wherein the first liquor is added with fresh $H_2SO_4$, to produce a zinc rich liquor.

10. The method of claim 1 further comprising the steps of subjecting the second liquor to a solution purification step prior to the zinc precipitation step wherein Fe(III) is reduced to Fe(II) to create a reduced second liquor, the reduced second liquor then being subjected to zinc dust cementation and the zinc dust cemented liquor's pH then being raised to between about 4 and 5 using alkali to precipitate out Al and Cr to leave behind and iron and zinc containing solution, the iron and zinc containing solution then being subjected to an iron removal step followed by solid liquid separation to yield an iron containing residue and a purified second liquor, the purified second liquor then proceeding to the zinc precipitation step.

11. The method of claim 10 wherein the iron removal step comprises acidifying the purified iron and zinc containing solution with HCl and then oxidizing with an oxidant selected from the group comprising $Cl_2$, $O_2$, $H_2O_2$, NaOCl and $NaClO_3$ to form an oxidized liquor, the oxidized liquor then being subjected to iron precipitation using thermal hydrolysis by heating the oxidized liquor to near boiling and then increasing the pH to between about 1.5 and about 3.5 using an alkali, a solid liquid separation step then being performed to leave the iron containing residue and the purified second liquor, the purified second liquor then proceeding towards the zinc precipitation step.

12. The method of claim 1 wherein the zinc precipitation step comprises subjecting the second liquor to precipitation by adding alkali to increase the pH to between about 8.5 and about 14 and then performing a solid liquid separation to produce the third residue and the third liquor, the third residue consisting of zinc salt or a mixed zinc hydroxide cake.

13. The method of claim 11 wherein the zinc precipitation step comprises subjecting the second liquor to precipitation by adding alkali to increase the pH to between about 8.5 and about 14 and then performing a solid liquid separation to produce the third residue and the third liquor, the third residue consisting of zinc salt or a mixed zinc hydroxide cake.

14. The method of claim 13 wherein the mineral acid used for the first leach is $H_2SO_4$ and further comprising the steps of leaching the third residue with the first leach liquor to create a fourth liquor, the fourth liquor then being subjected to zinc recovery.

15. The method of claim 11 wherein the iron precipitation stop is carried out in the presence of an iron oxide seed.

* * * * *